(12) United States Patent
Morishita

(10) Patent No.: US 7,111,944 B2
(45) Date of Patent: Sep. 26, 2006

(54) IMAGE PROJECTOR

(75) Inventor: Isaya Morishita, Daito (JP)

(73) Assignee: Funai Electric Co., Ltd., Daito (JP)

( * ) Notice: Subject to any disclaimer, the term of this patent is extended or adjusted under 35 U.S.C. 154(b) by 190 days.

(21) Appl. No.: 10/936,476

(22) Filed: Sep. 9, 2004

(65) Prior Publication Data
US 2005/0052622 A1 Mar. 10, 2005

(30) Foreign Application Priority Data
Sep. 9, 2003 (JP) .............................. 2003-317345

(51) Int. Cl.
G03B 21/14 (2006.01)
(52) U.S. Cl. ........................................ 353/85
(58) Field of Classification Search ................ 353/85, 353/122; 315/308
See application file for complete search history.

(56) References Cited

U.S. PATENT DOCUMENTS

| | | | | |
|---|---|---|---|---|
| 5,567,030 | A * | 10/1996 | Shin | 353/85 |
| 6,409,350 | B1 * | 6/2002 | Kakimoto et al. | 353/85 |
| 6,783,248 | B1 * | 8/2004 | Miyata | 353/85 |
| 6,827,453 | B1 * | 12/2004 | D'Alessio et al. | 353/85 |
| 6,979,960 | B1 * | 12/2005 | Okawa et al. | 315/291 |
| 6,992,811 | B1 * | 1/2006 | Williams et al. | 359/291 |
| 2005/0185149 | A1 * | 8/2005 | Lurkens et al. | 353/85 |
| 2006/0055893 | A1 * | 3/2006 | Tseng et al. | 353/85 |

FOREIGN PATENT DOCUMENTS

| | | |
|---|---|---|
| JP | 05-038481 | 2/1993 |
| JP | 2000-048989 | 2/2000 |

* cited by examiner

Primary Examiner—William C. Dowling
(74) Attorney, Agent, or Firm—Crowell & Moring LLP

(57) ABSTRACT

In an image projector for enlarging and projecting an image on a screen, a condition of a discharge lamp is judged so as to alarm that the discharge lamp has been damaged or life of the discharge lamp reaches to a late stage to a user. A driving circuit of the image projector comprises: a driving signal generator generating a driving signal applied to the discharge lamp, and executing feedback control so as to make power consumption of the discharge lamp substantially constant; a lamp condition judger judging that the discharge lamp has been damaged, the discharge lamp has been normally lighted or not lighted or life of the discharge lamp reaches to a late stage corresponding to a value of voltage or current of the driving signal; and an alarm output unit outputting an alarm corresponding to the result of judgment of the lamp condition judger.

7 Claims, 5 Drawing Sheets

IMAGE PROJECTOR

BACKGROUND OF THE INVENTION

1. Field of the Invention

The present invention relates to lighting control of a lamp of an image projector.

2. Description of the Related Art

An image projector, which reproduces an image with using an image data outputted from an external apparatus such as a personal computer or a video camera and projects the image on a screen by a projection lens, is conventionally known.

Since the image projector enlarges the image on the screen disposed at a long distance, it uses a high intensity discharge lamp as a light source for displaying the image brightly. In the discharge lamp, it is known that a load between terminals of the lamp where the discharge occurs (hereinafter abbreviated as load of the lamp) varies after starting the lighting of the lamp, so that a driving voltage necessary for lighting the lamp (hereinafter abbreviated as lamp voltage) varies correspondingly. Specifically, the lamp voltage is relatively low just after the start of the lighting, and the lamp voltage gradually increases to be stable. Furthermore, the lamp voltage of the discharge lamp entirely becomes higher when life of the discharge lamp reaches to a late stage.

If the driving voltage applied to the discharge lamp is set to be constant regardless of such the behaviors of the discharge lamp, the luminance of the discharge lamp becomes lower corresponding to the increase of the load of the lamp. Thus, it is necessary to execute a feedback control of the driving voltage by a driving circuit of the image projector in a manner so that the luminance of the discharge lamp is maintained substantially constant. In other words, it is necessary that the power consumption of the discharge lamp is maintained substantially constant.

On the other hand, when the driving voltage of the discharge lamp is made too high due to the feedback control, the discharge lamp involves a risk of bursting. Thus, a safety circuit is conventionally provided in the driving circuit of the discharge lamp in a manner so that the safety circuit senses a value of the driving voltage of the discharge lamp, and outputs an alarm or extinguishes the discharge lamp when the value of the driving voltage becomes equal to or larger than a predetermined reference value.

Conventionally, various technologies are proposed for estimating the life of the discharge lamp and announcing a time for replacing the discharge lamp or occurrence of burning out of the discharge lamp.

In a lighting apparatus of a discharge lamp shown in Publication Gazette of Japanese Patent application 5-36481, the above-mentioned behaviors that the lamp voltage is lower just after the start of the lighting, and the lamp voltage gradually increases to be stable, and the lamp voltage of the discharge lamp entirely becomes higher when the life of the discharge lamp reaches to a late stage is utilized for announcing that the discharge lamp should be replaced. The lighting apparatus senses the lamp voltage after passing a predetermined term from the start of the lighting of the discharge lamp, counts a number of the cases that the lamp voltage becomes equal to or higher than a predetermined reference voltage, and displays a message to replace the discharge lamp when the number becomes larger than a predetermined reference number.

In another lighting apparatus shown in Publication Gazette of Japanese Patent application 2000-48989, the safety circuit is activated after passing a predetermined term from the start of the lighting of the discharge lamp in order to prevent malfunction of the safety circuit due to the increase of the lamp voltage in a short term when the life of the discharge lamp reaches to a late stage.

A current, however, flows in the discharge lamp, even when the discharge lamp has not been lighted due to the driving voltage is lower. The conventional driving circuit of the image projector senses the driving voltage applied to the discharge lamp and only judges whether it is in critical condition or not by comparing a value of the driving voltage with the predetermined reference value corresponding to an upper limit of the permissible driving voltage. Thus, it is impossible to judge whether the discharge lamp has been actually lighted or not.

Furthermore, when the feedback control is executed under the condition that the driving voltage is lower, the current flowing in the driving circuit becomes larger. Thus, there is a possibility that the critical condition such as over heat occurs due to the over current.

Still furthermore, when it is attempt to relight the discharge lamp just after the discharge lamp has been extinguished (it is called "hot-start"), the temperature of the discharge lamp has become too high so that the load of the lamp has been too large. Thus, it is necessary to make the driving voltage much higher so as to relight the discharge lamp. Thus, the discharge lamp could be damaged. With respect to such the problem of the hot-start, the same goes for the above-mentioned conventional lighting apparatuses.

SUMMARY OF THE INVENTION

A purpose of the present invention is to provide an image projector, which judges the condition of the discharge lamp so as to execute proper lighting control.

An image projector in accordance with an aspect of the present invention comprises a discharge lamp, a discharge lamp driving circuit, an image reproducer, an image reproducer driving circuit for driving the image reproducer with using an image data outputted from an external apparatus, a projection lens for projecting an image reproduced by the image reproducer on a screen, and a display device for displaying at least information of a condition of the discharge lamp.

The discharge lamp driving circuit further comprises: a driving signal generator generating a driving signal applied to the discharge lamp, and executing feedback control for varying voltage of the driving signal corresponding to variation of a load of the discharge lamp in a manner so that power consumption of the discharge lamp becomes substantially constant; a lamp condition judger sensing a signal corresponding to the voltage or current of the driving signal applied to the discharge lamp, and judging that the discharge lamp has been damaged, the discharge lamp has been normally lighted, the discharge lamp has not been lighted or the life of the discharge lamp reaches to the late stage corresponding to a value of the sensed voltage or the sensed current; and an alarm output unit connected between the lamp condition judger and the display device and outputting an alarm corresponding to at least that the discharge lamp has been damaged, the discharge lamp has not been lighted and the life of the discharge lamp reaches to the late stage based on a result of judgment of the lamp condition judger.

When the driving signal generator generates no driving signal, in other wards, when the driving signal generator has not been functional, the lamp condition judger can judge that the discharge lamp has been damaged. When the driving signal generator generates the driving signal and the voltage or the current of the driving signal is normal, the lamp condition judger can judge that the discharge lamp has been normally lighted. When the driving signal generator generates the driving signal but the voltage or the current of the driving signal is abnormal, the lamp condition judger can judge that the life of the discharge lamp reaches to the late stage corresponding to the value of the voltage or the current of the driving signal. Since the alarm output unit makes the display device display a message for alarming that the discharge lamp has been damaged, the discharge lamp has not been lighted and the life of the discharge lamp reaches to the late stage, a user can recognize necessity of replacement of the discharge lamp.

DETAILED DESCRIPTION OF THE EMBODIMENT

Figure 1:
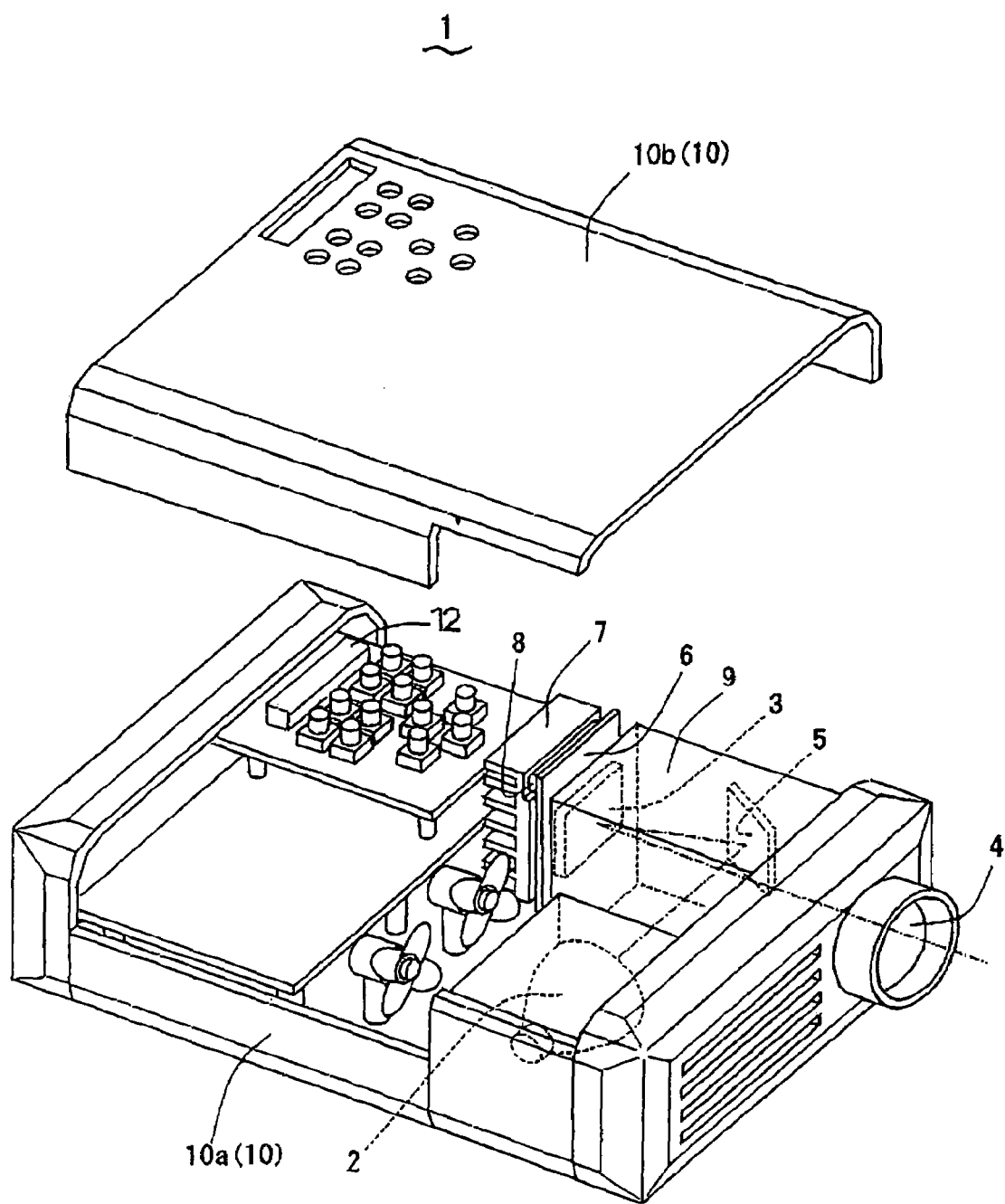
FIG. 1 is a perspective view showing a configuration of an image projector in accordance with an embodiment of the present invention.

An image projector in accordance with an embodiment of the present invention is described with reference to the drawings. FIG. 1 shows a configuration of the image projector 1 in accordance with the embodiment, in which a cover 10b is removed. The image projector 1 reproduces an image with using an image data outputted from an external apparatus such as a personal computer or a video camera, enlarges and projects the image on a screen disposed at a long distance in front of the image projector 1.

The image projector 1 is configured by a discharge lamp 2, an image reproducer 3 such as a micro mirror device, a projection lens 4 for enlarging and projecting an image formed by the image reproducer 3 on a screen, a mirror 5 for reflecting a light beam emitted from the discharge lamp 2 toward the image reproducer 3, a circuit board 6, a heat sink 7, a conductive member 8, a base member 9, a housing 10, a display device 12 such as an LCD (Liquid Crystal Display), and so on. The housing 10 is configured by a chassis 10a and a cover 10b which is detachable with respect to the chassis 10a.

The micro mirror device serving as the image reproducer 3 has a matrix arrangement of movable micro mirrors which are driven by electrostatic absorption and arranged corresponding to pixels of an imaging device such as a CCD (Charge Coupled Device). The micro mirror device controls each micro mirror corresponding to the image data so as to vary the reflection direction of the light beam emitted from the discharge lamp 2. Thus, the light beams reflected toward the projection lens 5 by the micro mirrors can reach the screen, so that an image can be projected on the screen.

The circuit board 6 includes a driving circuit of the image reproducer 3 for driving the image reproducer 3 with using the image data, and a discharge lamp driving circuit 60 (see FIG. 2) for controlling the lighting of the discharge lamp 2.

The heat sink 7 is used for radiating the heat generated when the light beam emitted from the discharge lamp 2 irradiates the image reproducer 3. The conductive member 8 is used for transmitting the heat generated on the circuit board 6 to the heat sink 7. The image reproducer 3, the mirror 5, thee circuit board 6, the heat sink 7, the conductive member 8, and so on are fixed on the base member 9.

In the image projector 1, the discharge lamp 2 having a high intensity is used as the light source so that the image is projected on the screen disposed at a long distance from the image projector 1 as clear as possible. As mentioned above, the discharge lamp 2 has a first behavior that the lamp voltage is lower just after the start of the lighting, and the lamp voltage gradually increases to be stable, and a second behavior that the lamp voltage entirely becomes higher when the life of the discharge lamp reaches to the late stage. Thus, the discharge lamp driving circuit 60 can sense that the discharge lamp has been damaged or the life of the discharge lamp has reached to the late stage, similar to the conventional apparatus. Furthermore, the discharge lamp driving circuit 60 can sense whether the discharge lamp has not been lighted or not and can display a message corresponding to the condition of the discharge lamp on the display device 12.

Figure 2:
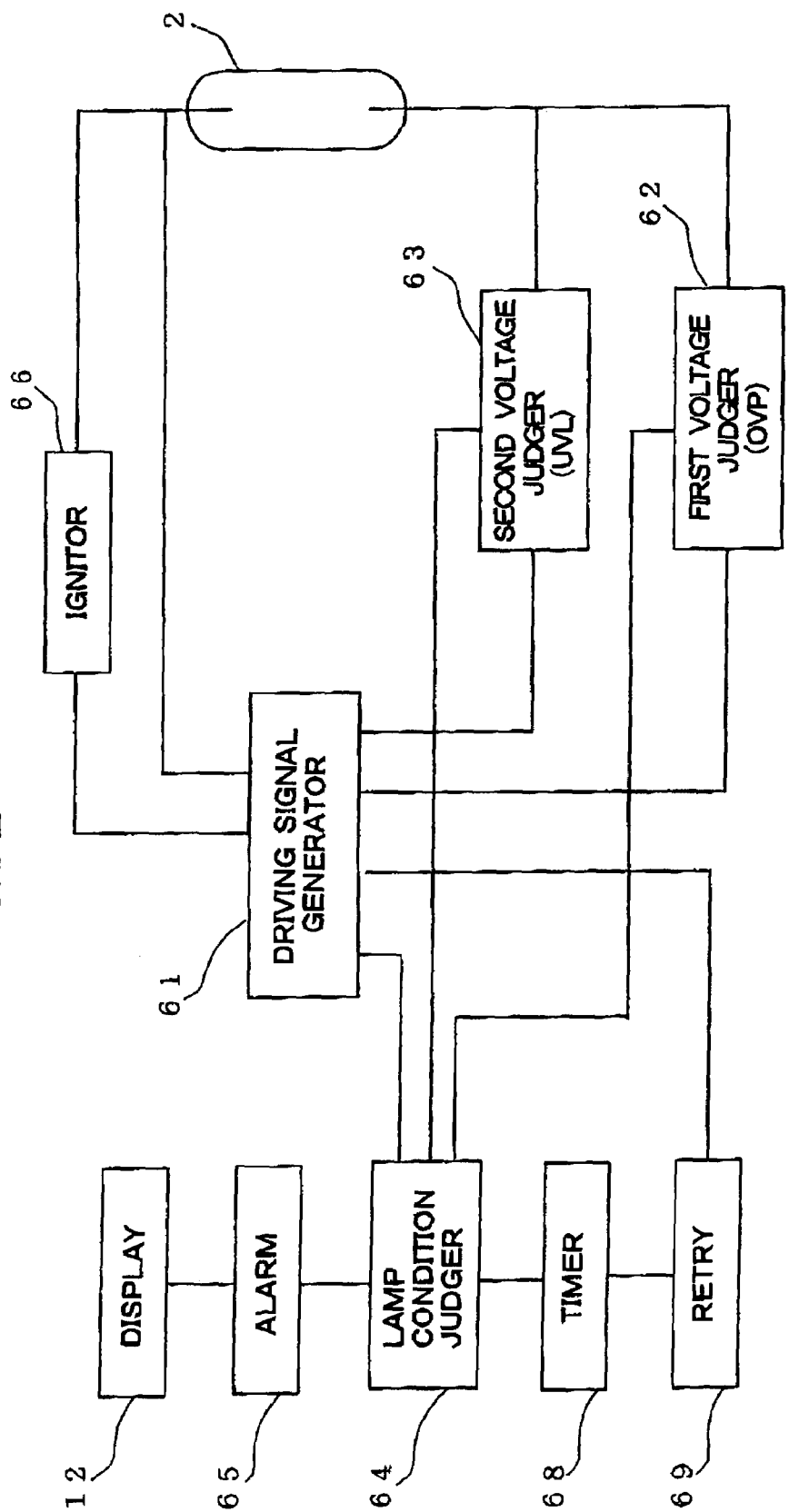
FIG. 2 is a block diagram showing an example of a driving circuit for a discharge lamp in the image projector.

An example of the configuration of the discharge lamp driving circuit 60 is shown in FIG. 2. The discharge lamp driving circuit 60 comprises a driving signal generator 61 such as an inverter circuit, a first voltage judger 62 serving as an over voltage protection (OVP), a second voltage judger 63 serving as an under voltage lockout (UVL), a lamp condition judger 64, an alarm output unit 65, an ignitor 66, a timer unit 68, and a retry unit 69.

The driving signal generator 61 generates pulsed driving signal having a predetermined frequency and a predetermined voltage and applied to the discharge lamp 2. The driving signal generator 61 further executes a feedback control for varying the voltage of the driving signal corresponding to the variation of the load of the discharge lamp 2 in a manner so that power consumption of the discharge lamp 2 is maintained substantially constant.

The first voltage judger 62 senses the voltage of the driving signal applied to the discharge lamp 2, and outputs a predetermined over voltage signal when a value of the sensed voltage of the driving signal is equal to or larger than a first reference voltage at which the discharge lamp 2 is in a critical condition such that the discharge lamp 2 could burst due to the load of the discharge lamp 2 is too large.

The second voltage judger 63 senses the voltage of the driving signal applied to the discharge lamp 2, and outputs a predetermined insufficient voltage signal when a value of the sensed voltage of the driving signal is smaller than a second reference voltage at which the discharge lamp 2 can be lighted.

The lamp condition judger 64 is connected to the driving signal generator 61, the first voltage judger 62 and the second voltage judger 63 so as to judge the condition of the discharge lamp 2. The alarm output unit 65 is connected between the lamp condition judger 64 and the display device 12 so as to make the display device 12 display a predetermined alarm or message corresponding to the result of the judgment of the lamp condition judger 64. The ignitor 66 applies a high voltage to the discharge lamp 2 at the start of lighting so as to light the discharge lamp 2 easily.

When the discharge lamp 2 has been damaged or the wiring is broken, no current flows in the discharge lamp 2, so that the driving signal generator 61 outputs no driving signal. Thus, the lamp condition judger 64 judges that the discharge lamp 2 has been damaged when the driving signal generator 61 generates no driving signal. When the driving signal generator 61 outputs the driving signal, the first voltage judger 62 outputs no over voltage signal and the second voltage judger 63 outputs no insufficient voltage signal, the voltage of the driving signal is in a normal value, so that it is considered that the discharge lamp 2 has been normally lighted. Thus, the lamp condition judger 64 judges that the discharge lamp 2 has been normally lighted. Furthermore, when the driving signal generator 61 outputs the driving signal and the second voltage judger 63 outputs the insufficient voltage signal, it is considered that the current flows in the discharge lamp 2 but the discharge lamp 2 has not been lighted due to the voltage of the driving signal is too low. Thus, the lamp condition judger 64 judges that the discharge lamp 2 has not been lighted. Still further more, when the driving signal generator 61 outputs the driving signal and the first voltage judger 62 outputs the over voltage signal, it is considered that the load of the discharge lamp 2 becomes too large, so that the voltage of the driving signal becomes too high. Generally, when the life of the discharge lamp 2 reaches to the rate state, such the phenomenon occurs. Thus, the lamp condition judger 64 judges that the life of the discharge lamp 2 reaches to the rate state.

The alarm output unit 65 outputs a predetermined signal to the display device 12 so as to make the display device 12 display a predetermined alarm or message announcing that the discharge lamp 2 has been damaged, that the discharge lamp 2 has not been lighted or that the life of the discharge lamp 2 reaches to the rate state corresponding to the result of the judgment of the lamp condition judger 64. It, however, is possible to use an array of red colored LEDs (light emitting diodes) as the display device 12 instead of the LCD. In such the case, it is possible to distinguish the contents of the alarm by combinations of a plurality of lighted LEDs.

Figure 3:
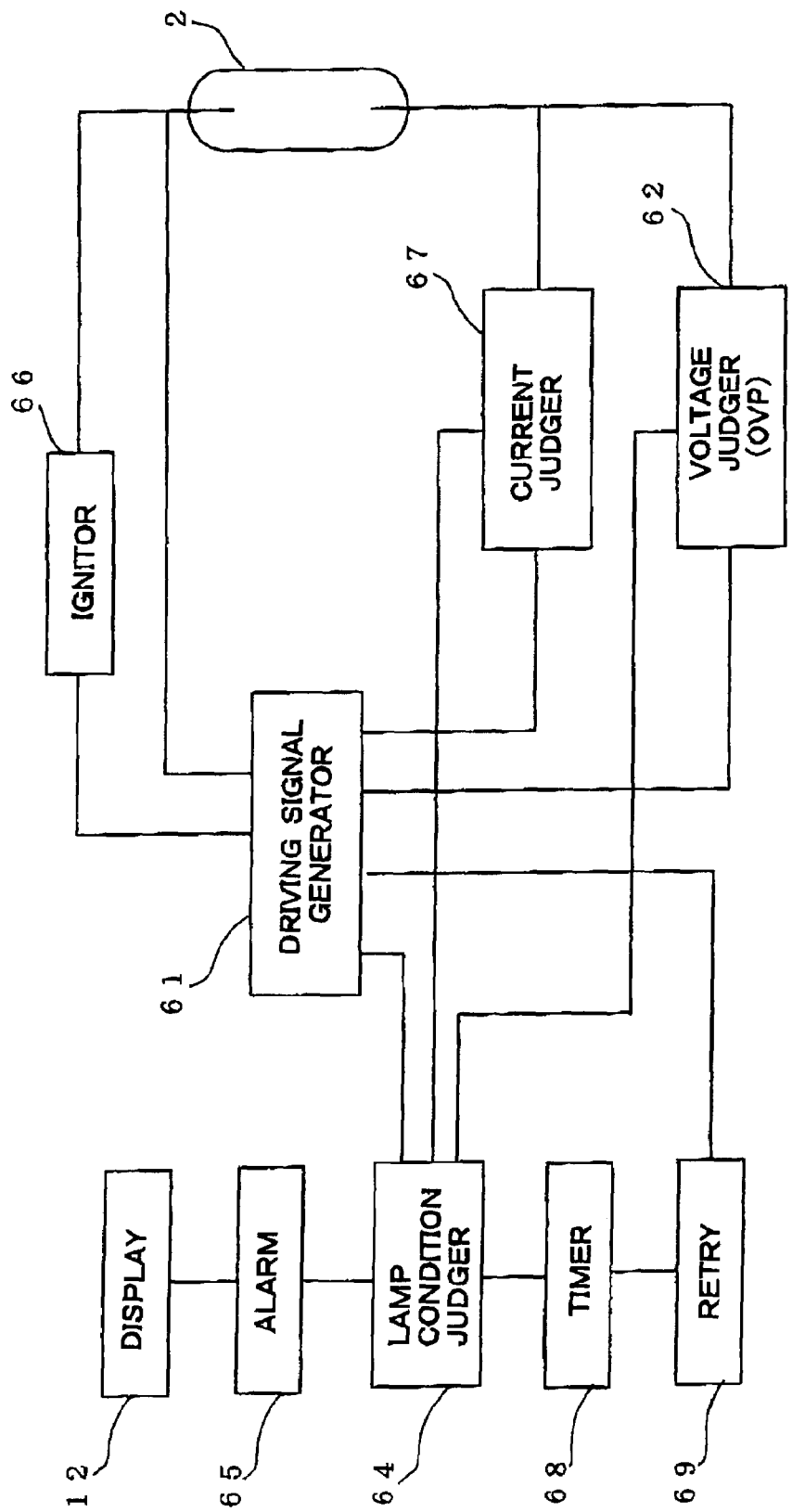
FIG. 3 is a block diagram showing another example of a driving circuit for a discharge lamp in the image projector.

Subsequently, another example of the configuration of the discharge lamp driving circuit 60 is shown in FIG. 3. The discharge lamp driving circuit 60 comprises a driving signal generator 61, a voltage judger 62 (OVP), a current judger 67, a lamp condition judger 64, an alarm output unit 65, an ignitor 66, a timer unit 68, and a retry unit 69. Elements designated by the same numerals in the example shown in FIG. 2 are substantially the same as those, so that the explanations of them are omitted.

The current judger 67 senses the current of the driving signal applied to the discharge lamp 2, and outputs a predetermined abnormal current signal when a value of the current of the driving signal is out from a predetermined region of the current in which the discharge lamp 2 can be lighted.

In the example of the discharge lamp driving circuit 60 shown in FIG. 2, the voltage of the driving signal is compared with an upper limit and a lower limit of a region of the voltage in which the discharge lamp 2 can be lighted. On the other hand, in the example of the discharge lamp driving circuit 60 shown in FIG. 3, the current of the driving signal is compared with an upper limit and a lower limit of the region of the current in which the discharge lamp 2 can be lighted.

Subsequently, an example for driving the discharge lamp 2 is described under the assumption that the power consumption of the discharge lamp is maintained to be 150 W. When the voltage of the driving signal is set to be 75V, the current of the driving signal transits in the vicinity of 2 A while the discharge lamp 2 is stable. Under such the condition, the load of the discharge lamp 2 varies a little, and the current of the driving signal also varies correspondingly, even when the voltage of the driving signal is maintained to be 75V. The variation of the discharge lamp 2, however, is much smaller, so that the image projected on the screen is rarely affected. On the other hand, the load of the discharge lamp 2 is much smaller just after starting the lighting of the discharge lamp 2, so that the lamp voltage necessary for lighting the discharge lamp 2 becomes also much lower correspondingly. The load of the discharge lamp 2, however, gradually increases as time passes, so that the lamp voltage gradually becomes higher. Furthermore, the lamp voltage of the discharge lamp 2 entirely becomes higher when the life of the discharge lamp 2 reaches to the late stage. Thus, the discharge lamp driving circuit 60 controls the discharge lamp 2 in a manner so that the power consumption of the discharge lamp 2 is maintained to be substantially 150 W owing to, for example, the voltage of the driving signal is varied in a range from 50V to 150V. When the voltage of the driving signal is 50V, the current of the driving signal transits in the vicinity of 3 A. When the voltage of the driving signal is 150V, the current of the driving signal transits in the vicinity of 1 A.

In the example shown in FIG. 3, the current judger 67 judges that the discharge lamp 2 is normally lighted when the current of the driving signal is in a range equal to or larger than 1 A and equal to or smaller than 3 A. The current judger 67 outputs the abnormal current signal when the value of the current of the driving signal is out of this region.

In the example shown in FIG. 2, the second voltage judger 63 outputs the insufficient voltage signal when the value of the voltage of the driving signal becomes smaller than 50V. The first voltage judger 62 outputs the over voltage signal when the value of the voltage of the driving signal becomes larger than 150V.

It is possible to set the threshold values such as 52V and 145V in consideration of the error components.

Figure 4:
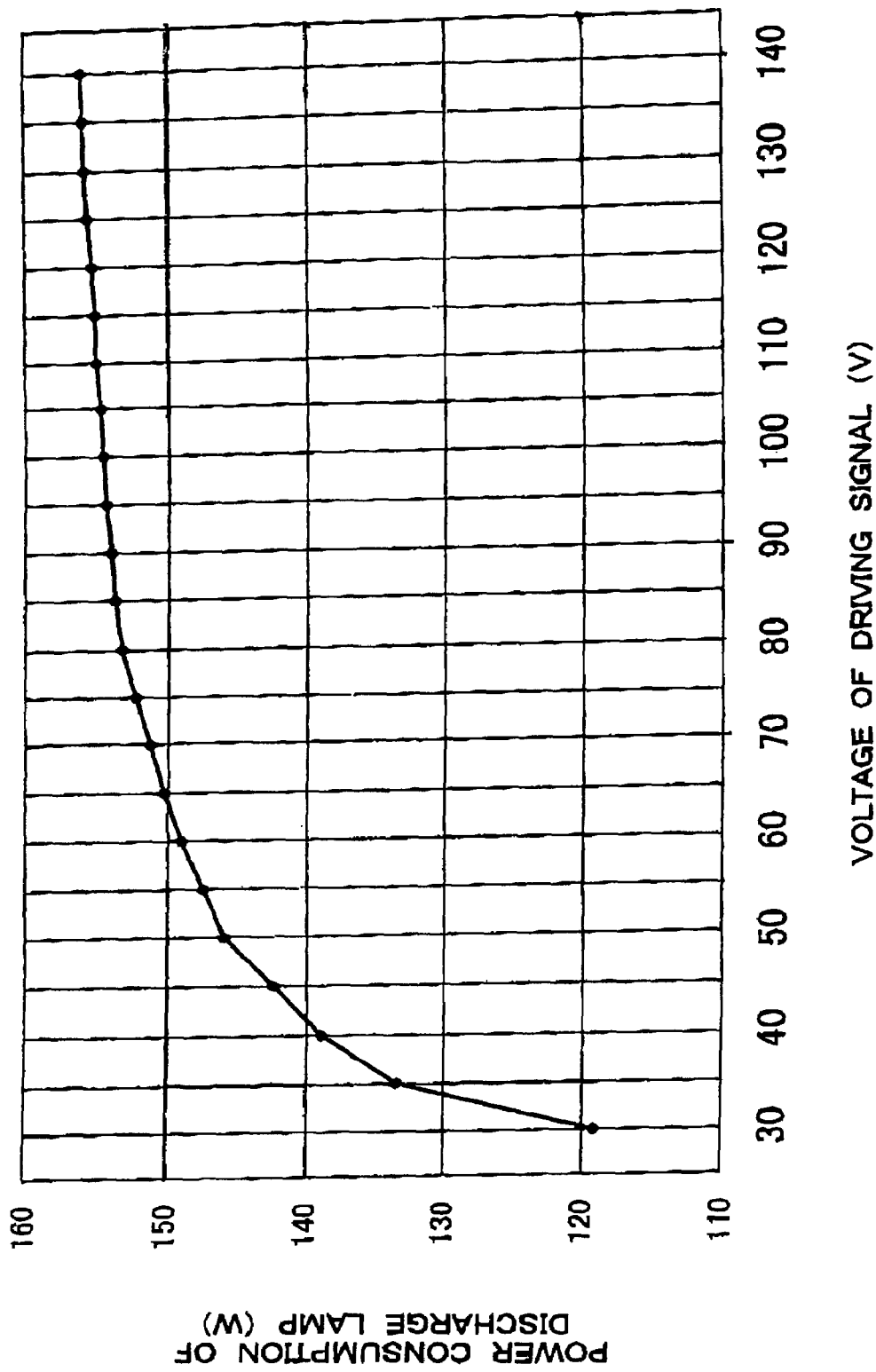
FIG. 4 is a graph showing a relation between power consumption and driving voltage of the discharge lamp.

A relation between the power consumption (wattage) and the voltage of the driving signal of the discharge lamp 2 is shown in FIG. 4. As can be seen from FIG. 4, it is possible to stabilize the power consumption of the discharge lamp 2 in the vicinity of 150 W, when the voltage of the driving signal is in the region from 50V to 150V (in FIG. 4, a portion of the characteristic curve in the vicinity of 150V is not illustrated). In the region where the voltage of the driving signal is smaller than 50V, it is found that the condition of the discharge lamp 2 is unstable due to the variation of the power consumption of the discharge lamp 2 is much larger. When the feedback control is executed in the discharge lamp driving circuit 60 with the target power consumption of 150 W under the condition that the voltage of the driving signal is lower, a large current larger than 3 A flows in the discharge lamp driving circuit 60. It will cause the heat in the discharge lamp driving circuit 60 or the breakdown of the discharge lamp driving circuit 60 due to the heat.

The discharge lamp driving circuit 60 in the embodiment, however, compares the voltage or the current of the driving signal with not only the upper limit but also the lower limit of the region where the discharge lamp 2 is normally lighted, and outputs the alarm showing the discharge lamp 2 is in abnormal condition when the voltage or the current of the driving signal is out of the region. Thus, it is possible to prevent the trouble due to the large current flows in the discharge lamp driving circuit 60. It is possible that the driving signal generator 61 automatically stops the generation of the driving signal, if required.

Figure 5:
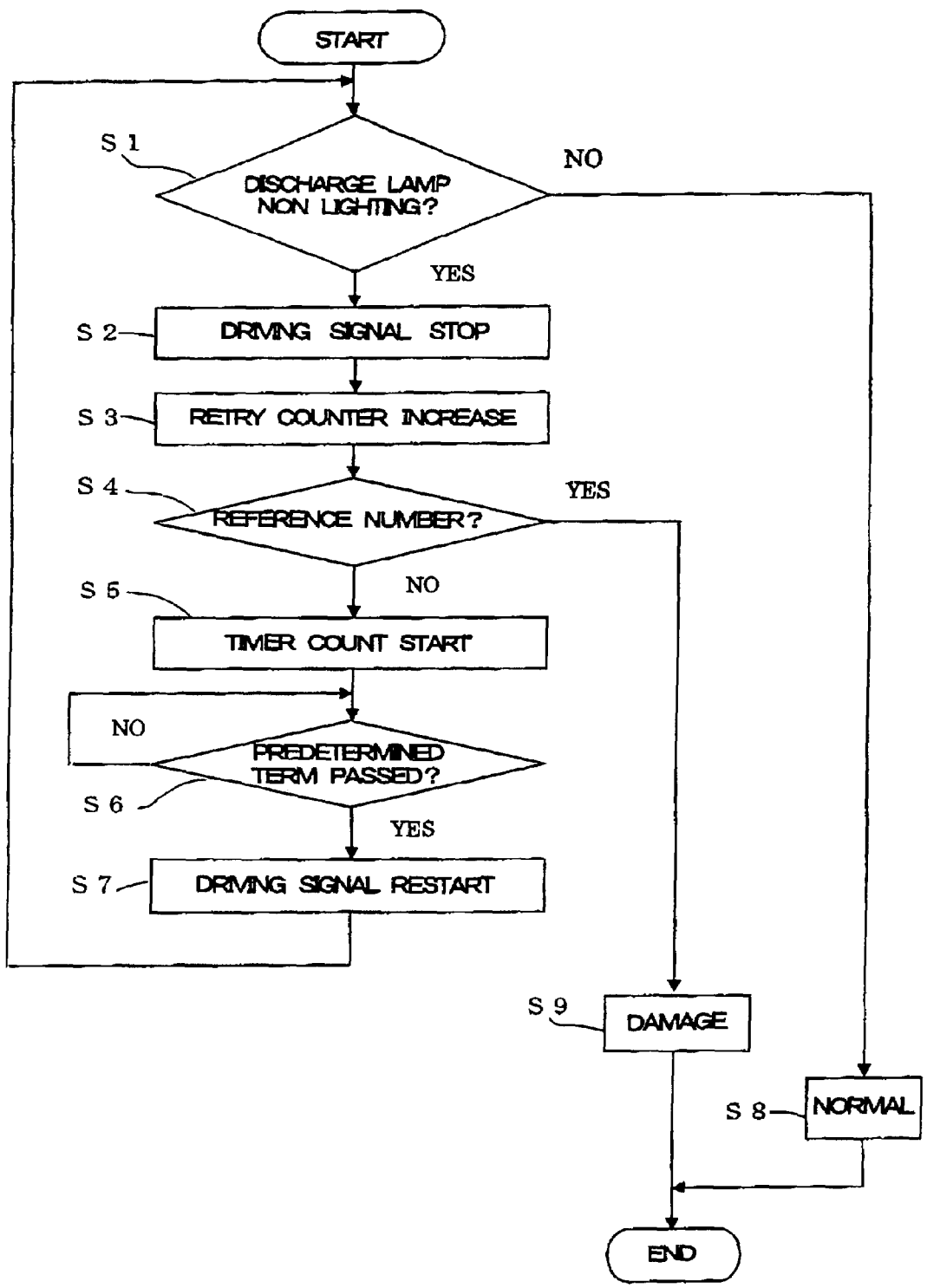
FIG. 5 is a flowchart showing a retry function of the driving circuit for lighting the discharge lamp in the image projector.

Subsequently, relighting function at the hot-start is described with reference to a flowchart shown in FIG. 5. It is known that the discharge lamp 2 is difficult to be lighted due to the pressure in the discharge lamp becomes too high when the temperature of the discharge lamp 2 is higher such as the case for relighting the discharge lamp 2 just after the extinction of the discharge lamp 2. Even when the discharge lamp 2 cannot be lighted at the hot-start, the discharge lamp 2 has not been damaged itself. Thus, it is possible to relight the discharge lamp 2 when the temperature of and the pressure in the discharge lamp 2 are decreased. Thus, the discharge lamp driving circuit 60 in the embodiment has the retry function for distinguishing the non lighting of the discharge lamp 2 due to the damage from the non lighting of the discharge lamp 2 at the hot-start, when the lamp condition judger 64 judges that the discharge lamp 2 has not been lighted.

When the lamp condition judger 64 judges that the discharge lamp 2 has not been lighted (S1), the driving signal generator 61 stops the generation of the driving signal (S2). The retry unit 69 increases a count number of a retry counter by one (S3), and judges whether the count number of the retry counter reaches to a predetermined reference number or not (S4). When the count number of the retry counter does not reach to the predetermined reference number (NO in S4), the timer unit 68 starts to count a timer (S5). When the timer unit 68 counts a predetermined time, for example, 30 second which is necessary that the pressure in the discharge lamp 2 can be decreased (S6), the retry unit 69 makes the driving signal generator 61 generate the driving signal again (S7). Subsequently, the flow returns to the step S1, and the lamp condition judger 64 judges whether the discharge lamp 2 has been lighted or not, again.

Hereupon, when the discharge lamp 2 is lighted, the discharge lamp 2 has not been damaged, so that the lamp condition judger 64 judges that the discharge lamp 2 is normal (S8), and completes this sequence. Alternatively, when the discharge lamp 2 is not lighted in the step S1, the sequence of the steps S2 to S7 is repeated. When the discharge lamp 2 cannot be lighted in the step S1 after the retry predetermined times, for example, three times, the lamp condition judger 64 judges that the discharge lamp has been damaged (S9), and completes this sequence. Since the discharge lamp driving circuit 60 has the retry function, it is possible to distinguish the non lighting of the discharge lamp 2 due to the damage from the non lighting of the discharge lamp 2 at the hot-start.

In the above-mentioned embodiment, the micro mirror device is exemplified as the image reproducer 3. The present invention, however, is not limited the description of the embodiment. Another image reproducer such as an LCD can be used as the image reproducer 3 in the image projector 1. Since the kind of the discharge lamp 2 is not especially limited, it is possible to use a high intensity discharge lamp such as a xenon lamp or a halogen lamp.

The image projector in accordance with the present invention comprises at least a discharge lamp; a discharge lamp driving circuit, an image reproducer; an image reproducer driving circuit for driving the image reproducer with using an image data outputted from an external apparatus; a projection lens for projecting an image reproduced by the image reproducer on a screen; and a display device for displaying at least information of a condition of the discharge lamp. Furthermore, the discharge lamp driving circuit comprises a function for generating a driving signal applied to the discharge lamp, and executing a feedback control for maintaining the power consumption of the discharge lamp substantially constant; a function for judging a condition of the discharge lamp whether the discharge lamp has been damaged or not, whether the discharge lamp has not been lighted or not, and the life of the discharge lamp reaches to the late stage or not; and a function for alarming at least that the discharge lamp has been damaged, the discharge lamp has not been lighted and the life of the discharge lamp reaches to the late stage.

This application is based on Japanese patent application 2003-317345 filed Sep. 9, 2003 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image projector comprising: a discharge lamp; a discharge lamp driving circuit, an image reproducer; an image reproducer driving circuit for driving the image reproducer with using an image data outputted from an external apparatus; a projection lens for projecting an image reproduced by the image reproducer on a screen; and a display device for displaying at least information of a condition of the discharge lamp; wherein the discharge lamp driving circuit further comprises:

a driving signal generator generating a driving signal applied to the discharge lamp, and executing a feedback control for varying voltage of the driving signal corresponding to variation of a load of the discharge lamp in a manner so that power consumption of the discharge lamp becomes substantially constant;

a lamp condition judger sensing a signal corresponding to the voltage or current of the driving signal applied to the discharge lamp, and judging that the discharge lamp has been damaged, the discharge lamp has been normally lighted, the discharge lamp has not been lighted or the life of the discharge lamp reaches to the late stage corresponding to a value of the sensed voltage or the sensed current; and an alarm output unit connected between the lamp condition judger and the display device and outputting an alarm corresponding to at least that the discharge lamp has been damaged, the discharge lamp has not been lighted and the life of the discharge lamp reaches to the late stage based on a result of judgment of the lamp condition judger.

2. The image projector in accordance with claim 1, wherein the discharge lamp driving circuit has retry function that the driving signal generator stops to generate the driving signal when the lamp condition judger judges that the discharge lamp has not been lighted, and the driving signal generator restarts to generate the driving signal after passing a predetermined term.

3. The image projector in accordance with claim 2, wherein when the lamp condition judger judges that the discharge lamp has not been lighted after repeating the retry function predetermined times, the lamp condition judger judges that the discharge lamp has been damaged.

4. An image projector comprising: a discharge lamp; a discharge lamp driving circuit; an image reproducer constituted by a micro mirror device; an image reproducer driving circuit for driving the image reproducer with using an image data outputted from an external apparatus; a projection lens for projecting an image reproduced by the image reproducer on a screen; a mirror for reflecting a light beam emitted from the discharge lamp toward the image reproducer; and a display device for displaying at least information of a condition of the discharge lamp; wherein the discharge lamp driving circuit further comprises:

a driving signal generator generating a pulsed driving signal having a predetermined frequency and a predetermined voltage and applied to the discharge lamp, and executing a feedback control for varying voltage of the driving signal corresponding to variation of a load of the discharge lamp in a manner so that power consumption of the discharge lamp becomes substantially constant;

a first voltage judger sensing voltage of the driving signal applied to the discharge lamp, and outputting a predetermined over voltage signal when a value of the sensed voltage of the driving signal is equal to or larger than a first reference voltage;

a second voltage judger sensing voltage of the driving signal applied to the discharge lamp, and outputting a predetermined insufficient voltage signal when a value of the sensed voltage of the driving signal is smaller than a second reference voltage at which the discharge lamp can be lighted;

a lamp condition judger connected to the driving signal generator, the first voltage judger and the second voltage judger, and judging that the discharge lamp has been damaged when the driving signal generator generates no driving signal, the discharge lamp has been normally lighted when the driving signal generator generates the driving signal, the first voltage judger outputs no over voltage signal and the second voltage judger outputs no insufficient voltage signal, the discharge lamp has not been lighted when the driving signal generator generates the driving signal and the second voltage judger outputs the insufficient voltage signal, or life of the discharge lamp reaches to the late stage corresponding to a value of the sensed voltage or the sensed current when the driving signal generator generates the driving signal and the first voltage judger outputs the over voltage signal; and an alarm output unit connected between the lamp condition judger and the display device and outputting an alarm corresponding to at least that the discharge lamp has been damaged, the discharge lamp has not been lighted and the life of the discharge lamp reaches to the late stage based on a result of judgment of the lamp condition judger.

5. The image projector in accordance with claim 4, wherein the discharge lamp driving circuit further comprises a timer and has retry function that the driving signal generator stops to generate the driving signal and the timer starts to count a predetermined term when the lamp condition judger judges that the discharge lamp has not been lighted, and the driving signal generator restarts to generate the driving signal after passing the predetermined term.

6. An image projector comprising: a discharge lamp; a discharge lamp driving circuit; an image reproducer constituted by a micro mirror device; an image reproducer driving circuit for driving the image reproducer with using an image data outputted from an external apparatus; a projection lens for projecting an image reproduced by the image reproducer on a screen; a mirror for reflecting a light beam emitted from the discharge lamp toward the image reproducer; and a display device for displaying at least information of a condition of the discharge lamp; wherein the discharge lamp driving circuit further comprises:

a driving signal generator generating a pulsed driving signal having a predetermined frequency and a predetermined voltage and applied to the discharge lamp, and executing a feedback control for varying voltage of the driving signal corresponding to variation of a load of the discharge lamp in a manner so that power consumption of the discharge lamp becomes substantially constant;

a voltage judger sensing voltage of the driving signal applied to the discharge lamp, and outputting a predetermined over voltage signal when a value of the sensed voltage of the driving signal is equal to or larger than a reference voltage;

a current judger sensing current of the driving signal applied to the discharge lamp, and outputting a predetermined abnormal current signal when a value of the sensed current of the driving signal is out of a predetermined region where the discharge lamp is lighted;

a lamp condition judger connected to the driving signal generator, the first voltage judger and the second voltage judger, and judging that the discharge lamp has been damaged when the driving signal generator generates no driving signal, the discharge lamp has been normally lighted when the driving signal generator generates the driving signal, the voltage judger outputs no over voltage signal and the current judger outputs no abnormal current signal, the discharge lamp has not been lighted when the driving signal generator generates the driving signal and the current judger outputs the abnormal current signal, or life of the discharge lamp reaches to the late stage corresponding to a value of the sensed voltage or the sensed current when the driving signal generator generates the driving signal and the first voltage judger outputs the over voltage signal; and an alarm output unit connected between the lamp condition judger and the display device and outputting an alarm corresponding to at least that the discharge lamp has been damaged, the discharge lamp has not been lighted and the life of the discharge lamp reaches to the late stage based on a result of judgment of the lamp condition judger.

7. The image projector in accordance with claim 6, wherein the discharge lamp driving circuit further comprises a timer and has retry function that the driving signal generator stops to generate the driving signal and the timer starts to count a predetermined term when the lamp condition judger judges that the discharge lamp has not been lighted, and the driving signal generator restarts to generate the driving signal after passing the predetermined term.

* * * * *